United States Patent
Schmid et al.

(10) Patent No.: US 7,317,267 B2
(45) Date of Patent: Jan. 8, 2008

(54) MOUNTING ARRANGEMENT FOR A REFRIGERATOR FAN

(75) Inventors: Alexandre Cury Schmid, Joinville (BR); Adriano Cargnin, Joinville (BR); Alexsandro Jose Pereira, Joinville (BR); Rogerio Rodrigues Junior, Joinville (BR)

(73) Assignee: Multibras S.A. Electrodomesticos, Sao Paulo-Sp (BR)

( * ) Notice: Subject to any disclaimer, the term of this patent is extended or adjusted under 35 U.S.C. 154(b) by 0 days.

(21) Appl. No.: 10/507,979

(22) PCT Filed: Apr. 16, 2003

(86) PCT No.: PCT/BR03/00059

§ 371 (c)(1),
(2), (4) Date: Sep. 15, 2004

(87) PCT Pub. No.: WO03/089858

PCT Pub. Date: Oct. 30, 2003

(65) Prior Publication Data

US 2005/0173997 A1    Aug. 11, 2005

(30) Foreign Application Priority Data

Apr. 19, 2002 (BR) .................................. 0201397

(51) Int. Cl.
  *H02K 5/24* (2006.01)
(52) U.S. Cl. .................. 310/51; 62/186; 310/67 R; 310/91; 417/363; 417/423.14; 248/603; 248/606
(58) Field of Classification Search ............... 310/51, 310/67 R, 91; 62/186; 417/423, 15, 363; 248/603–606, 560
See application file for complete search history.

(56) References Cited

U.S. PATENT DOCUMENTS

| | | | |
|---|---|---|---|
| 3,584,469 A | | 6/1971 | Butts |
| 4,568,243 A | * | 2/1986 | Schubert et al. ......... 415/213.1 |
| 4,834,615 A | * | 5/1989 | Mauch et al. ............. 415/213.1 |
| 6,170,275 B1 | * | 1/2001 | Ueno et al. .................... 62/186 |
| 6,351,380 B1 | * | 2/2002 | Curlee et al. ................. 361/695 |
| 6,584,799 B2 | * | 7/2003 | Jung et al. ..................... 62/419 |

FOREIGN PATENT DOCUMENTS

| | | | |
|---|---|---|---|
| DE | 38 09 627 A1 | | 10/1989 |
| EP | 1 092 876 A2 | | 4/2001 |
| GB | 883686 A | * | 12/1961 |
| GB | 2 107 787 A1 | | 5/1983 |

* cited by examiner

Primary Examiner—Karl Tamai

(57) ABSTRACT

A mounting arrangement for a refrigerator fan, comprising an electric motor (11) to whose shaft is affixed a propeller (12) with an axial flow passing through a refrigerated air outlet (4b) provided through an internal divisional wall (6) of the refrigerator; a support frame (20) having a marginal portion (21) and incorporating a central hub (22) in which is affixed the electric motor (11); a flexible support (30) in the form of an annular flange presenting an outer portion (31), which is peripherally and removably affixed to the contour of the refrigerated air outlet (4b), an inner portion (32) provided with a central opening (35) and with retaining means (36), which are removably locked to the marginal portion (21) of the support frame (20); and an annular membrane portion (33) interconnecting the outer portion (31) and the inner portion (32), in order to allow for small relative axial and radial displacements therebetween.

9 Claims, 5 Drawing Sheets

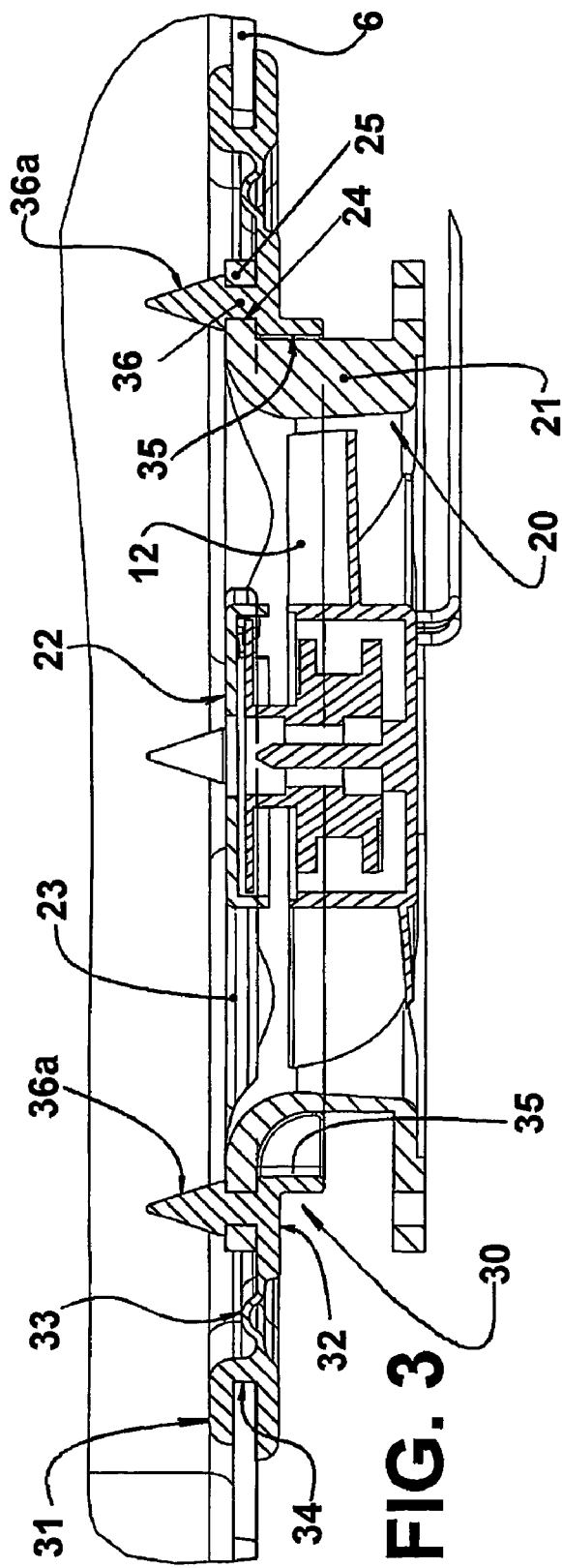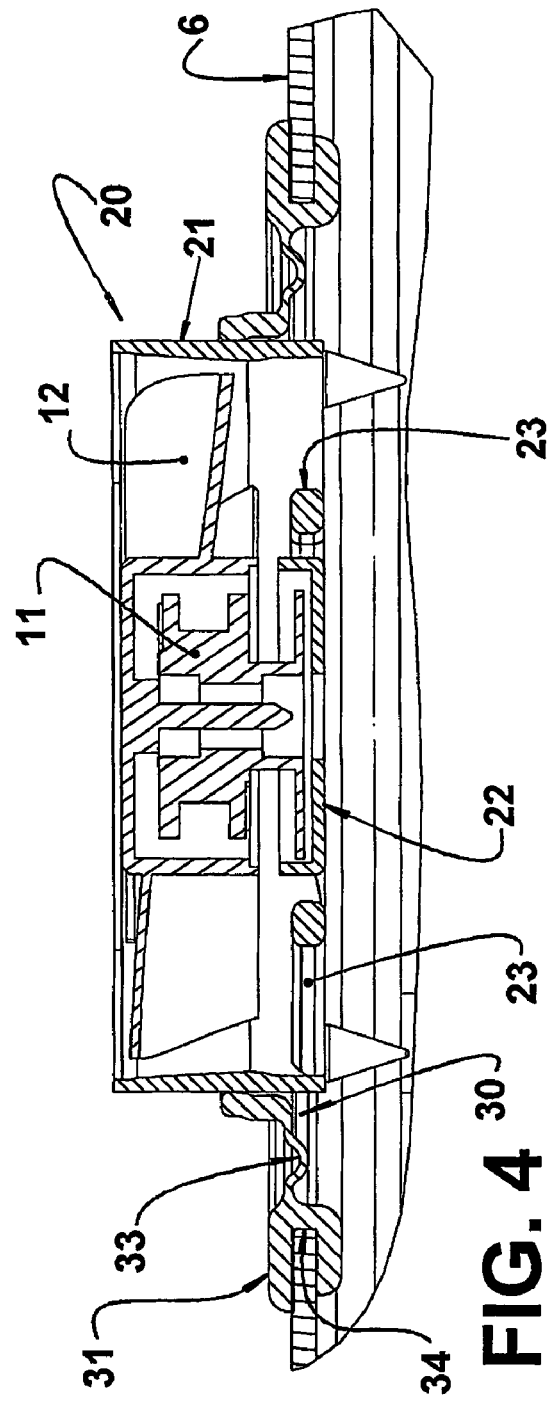

US 7,317,267 B2

MOUNTING ARRANGEMENT FOR A REFRIGERATOR FAN

This is a U.S. national phase application under 35 U.S.C. § 371 of International Patent Application No. PCT/BR2003/00059 filed Apr. 16, 2003 and claims the benefit of Brazilian Application No. PI 0201397-5 filed Apr. 19, 2002, The International Application was published in English on Oct. 30, 2003 as International Publication No. WO/2003/089858 under PCT Article 21(2) the contents of both applications are incorporated herein in their entirety.

FIELD OF THE INVENTION

The present invention refers to a mounting arrangement for a fan used to provide the forced air circulation through the evaporator compartment in a refrigerator of the simple or combined types, in which each storing compartment defined inside a cabinet is submitted to an airflow that is forced to pass through the evaporator.

BACKGROUND OF THE INVENTION

In the refrigerators with forced air circulation, the evaporator is positioned inside an air cooling compartment generally provided in the rear upper region of the refrigerator cabinet and presenting at least one circulated air inlet, which receives the air coming from the storing compartments of the refrigerator, and a refrigerated air outlet directed to said storing compartments.

In the combined refrigerators, the air cooling compartment is generally positioned behind the freezing compartment and in communication with the latter and with the refrigerating compartment through said refrigerated air outlet of the air cooling compartment, which outlet is opened to an adequate system of refrigerated air directing ducts.

In order to provide the necessary forced air circulation through the evaporator mounted in the air cooling compartment, drawing the air that is forced to circulate through the freezing and the refrigerating compartments, and returning the air to said freezing and refrigerating compartments after it has been refrigerated by the evaporator, the refrigerator is provided with a fan of axial flow, whose shaft is generally horizontally disposed and which is mounted to a divisional wall of the air cooling compartment through the air outlet of the latter defined by an opening in said divisional wall of the air cooling compartment.

In some prior art assemblies, the fan, comprising an electric motor to whose shaft is mounted a propeller, has said motor affixed directly to the wall of the air cooling compartment by means of a rigid support, which can take different forms, such as for example a tubular shell affixed to said divisional wall, coaxially to the outlet opening of the air cooling compartment.

Since the transmission of vibration from the electric motor to the remaining parts of the cabinet is one of the major sources of noise, it is known from the art the provision of mufflers or pads made of elastomeric material between the electric motor and the rigid support. This prior art constructive solution allows utilizing motors of low cost in which the tubular shell is replaced by a structural support with the approximate form of a cage. However, this constructive arrangement presents some disadvantages, such as the obstruction of part of the air intake area of the fan and the difficult fixation and replacement of the motor, requiring the disassembly of several other components (propeller, ducts, mufflers, etc).

Another known prior art solution uses a system in which the fixation is also made directly to the electric motor, but through a flexible annular support of elastomeric material, surrounding the body of the electric motor and incorporating substantially radial rods, whose ends are affixed to said divisional wall of the cabinet structure on which is provided the outlet opening of the air cooling compartment.

This construction of an elastomeric annular support with radial rods uses a small amount of material, incorporating the support and the mufflers in a single piece and allowing for the easy and rapid assembly and disassembly operations. However, this prior art solution is not sufficiently resistant to transportation, allowing damages to occur to the fan. The fact that the motor is directly affixed to the cabinet structure, having no cowlings for directing or conducting the airflow, results in efficiency loss of the forced air circulation system.

Besides the disadvantages mentioned above, the constructive solutions in which the motor is directly affixed to the cabinet by means of a rigid or flexible support make difficult or even infeasible to use fans provided from different suppliers, each fan requiring a respective adaptation for the motor support.

OBJECT OF THE INVENTION

In function of the deficiencies pointed out above in relation to the prior art mounting arrangements, the present invention has the generic object to provide a mounting arrangement for a fan of the type considered herein, which is developed to assure an adequate absorption of the motor vibrations, utilizing a resistant construction which is easily and quickly assembled and disassembled and which presents good performance in the forced air circulation.

It is a further object of the invention to provide a mounting arrangement as defined above, which further allows using fans produced by different suppliers and presenting dimensional and shape particularities.

SUMMARY OF THE INVENTION

Aiming at achieving the objects mentioned above, the present mounting arrangement is directed to a refrigerator fan comprising an electric motor, to whose shaft is affixed a propeller with an axial flow passing through a refrigerated air outlet provided through an internal divisional wall of the refrigerator.

According to the invention, the present arrangement comprises a support frame, having a marginal portion external to the contour of rotation of the propeller and incorporating a central hub in which is affixed the electric motor.

In order to mount the tubular shell-electric motor assembly in the refrigerator, there is provided a flexible support in the form of an annular flange, presenting an outer portion, which is peripherally and removably affixed to the internal divisional wall, along the contour of the refrigerated air outlet; an inner portion provided with a central opening and with retaining means, which are removably locked to the marginal portion of the support frame, in a condition in which said marginal portion is axially aligned with the central opening of the flexible support; and a membrane portion interconnecting the outer and inner portions, in order to allow for small relative axial and radial displacements therebetween.

The construction proposed herein allows the fan to be easily and rapidly attached to the inner portion of the flexible support, whose outer portion is mounted to the internal divisional wall of the refrigerator, preferably by simply fitting a peripheral groove on the edge of the internal divisional wall that defines the contour of the opening of the refrigerated air outlet.

Both the inner and the outer portions of the flexible support, which are preferably made of an elastomeric material, are united by the membrane portion, which allows for the relative movement between the two other portions of the flexible support, absorbing small displacements and vibrations of the electric motor-propeller assembly.

BRIEF DESCRIPTION OF THE DRAWINGS

The invention will be described below, with reference to the enclosed drawings, in which:

FIG. 3 is a cross-sectional view of the mounting arrangement of the invention, taken according to line III-III of FIG. 2;

FIG. 4 is a cross-sectional view of the mounting arrangement of the invention, taken according to line IV-IV of FIG. 2;

DESCRIPTION OF THE ILLUSTRATED EMBODIMENT

Figure 1:
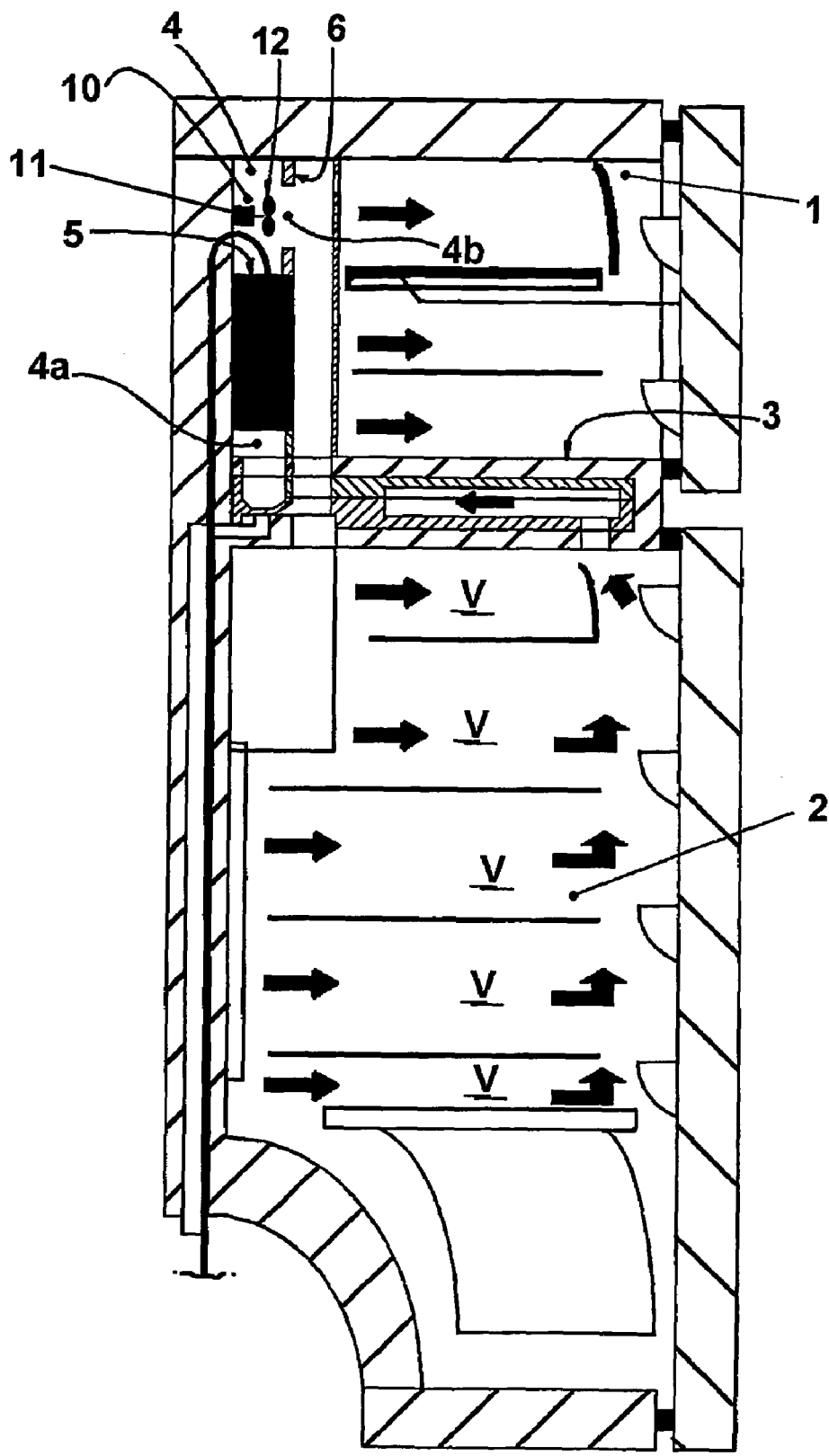
FIG. 1 is a schematic cross-sectional vertical view of a combined refrigerator with forced air circulation, illustrating the positioning of a fan mounted to an internal divisional wall of the refrigerator.
Figure 2:
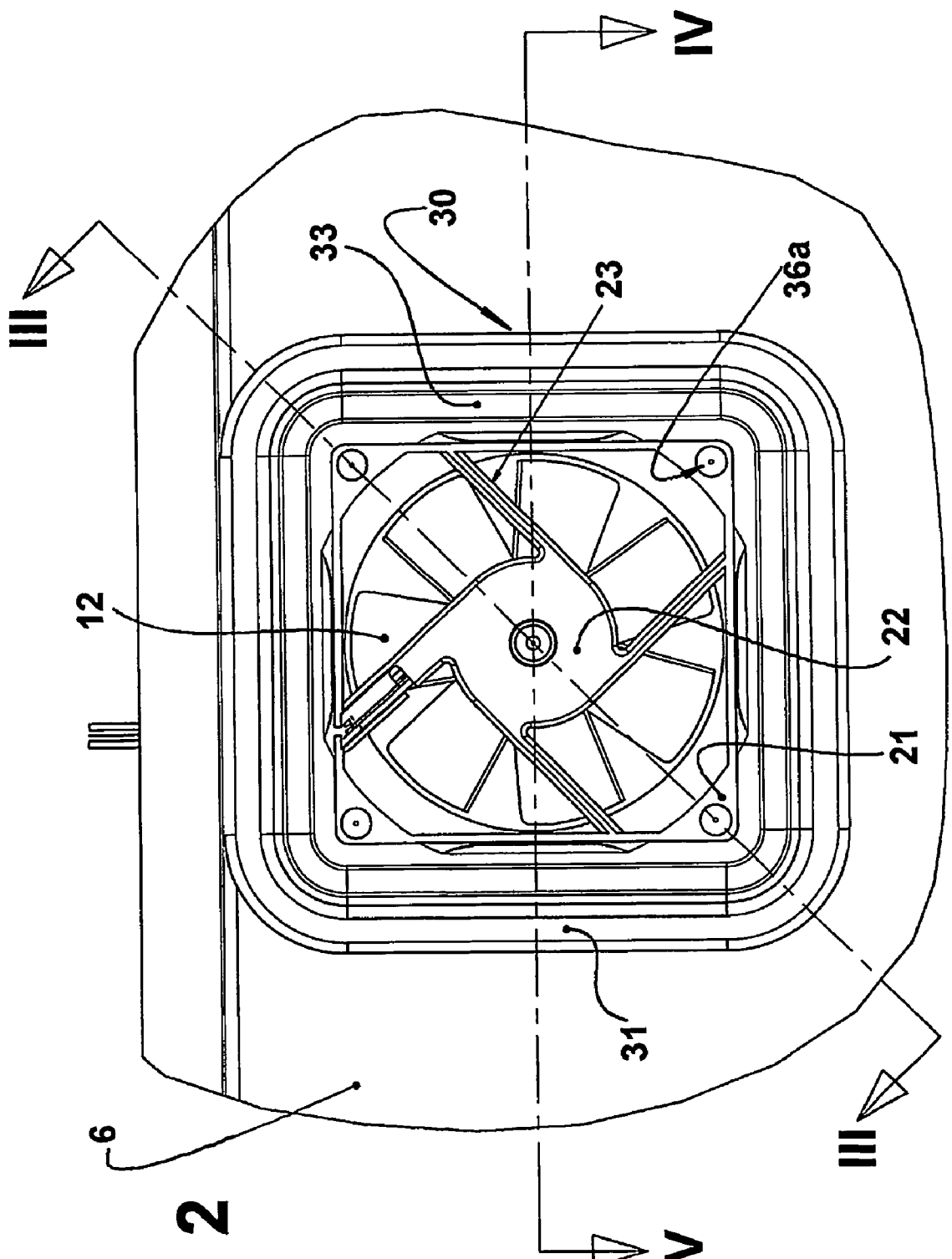
FIG. 2 is an enlarged rear view of the fan when affixed to the internal divisional wall of the refrigerator by means of the mounting arrangement of the present invention.
Figures 5, 6:
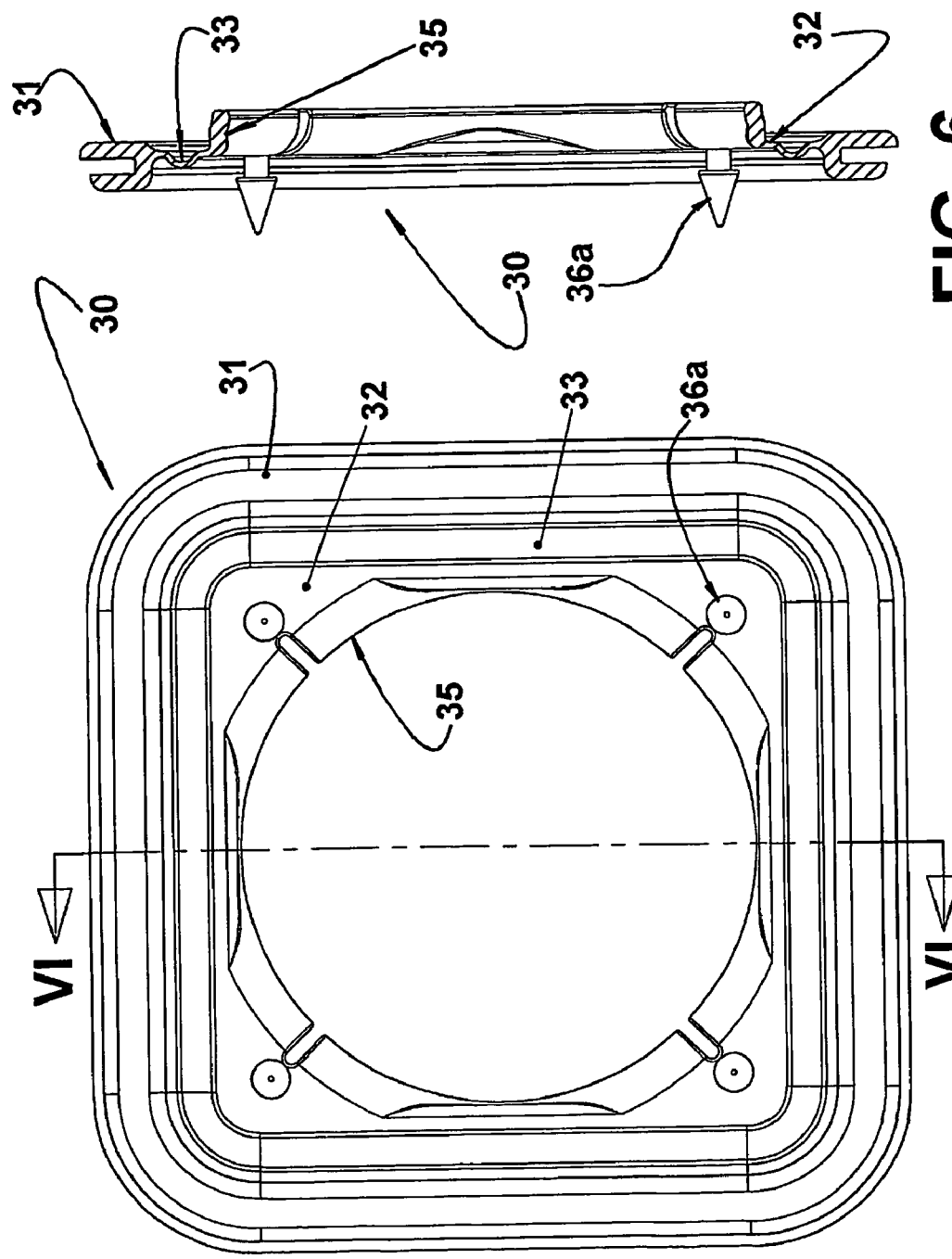
FIG. 5 is a rear plan view of the flexible support utilized in the mounting arrangement illustrated in FIGS. 2, 3 and 4.
FIG. 6 is a cross-sectional view of the flexible support, taken according to line VI-VI of FIG. 5.
Figure 7:
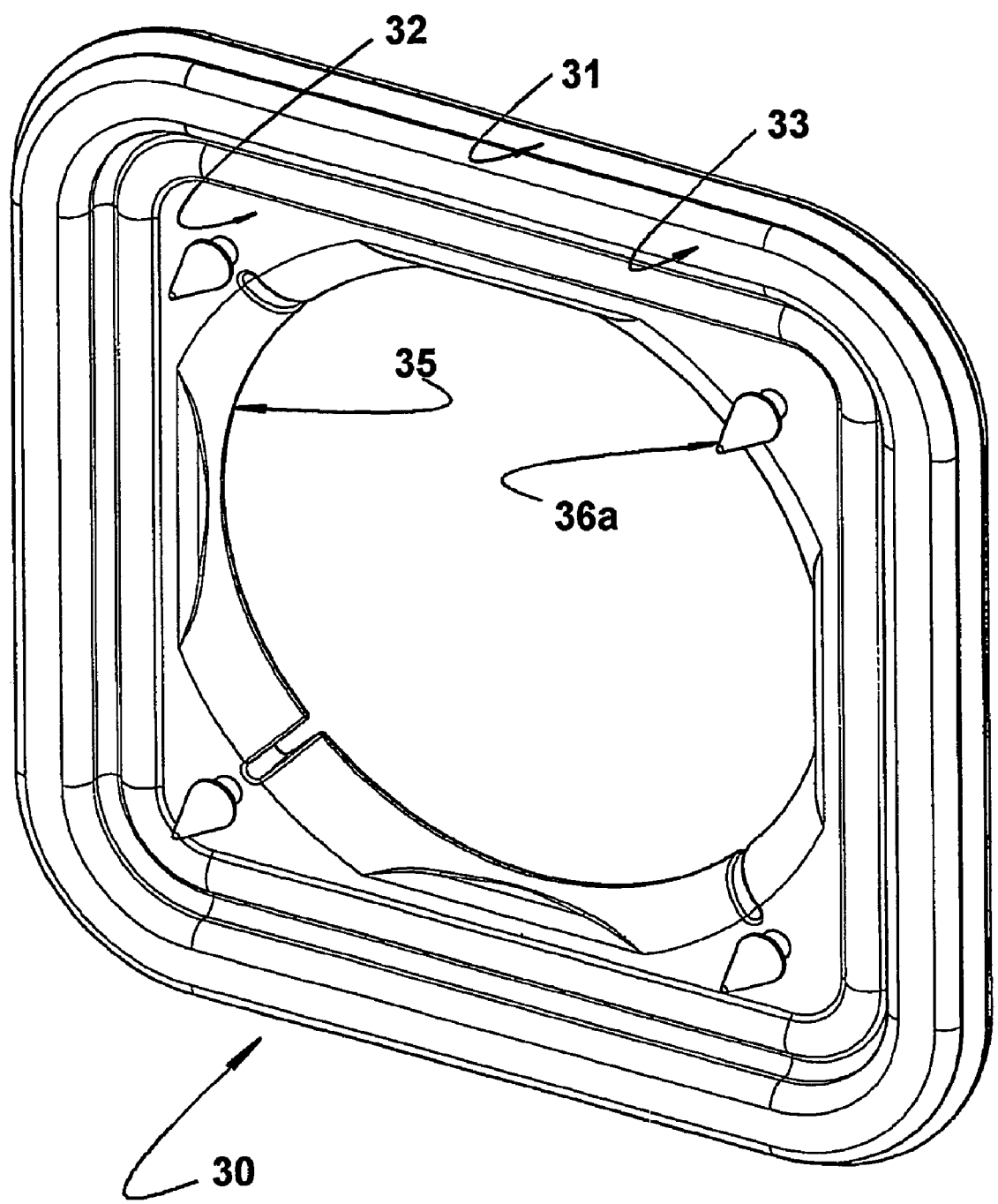
FIG. 7 is a rear perspective view of the flexible support illustrated in FIGS. 2-6.

As illustrated in FIG. 1 and as already mentioned above, the invention is applied to a combined refrigerator with forced air circulation, comprising a freezing compartment 1 and a refrigerating compartment 2 which are superposed and separated by an intermediate wall 3. The refrigerator further comprises an air cooling compartment 4, generally located close to the rear region of the freezing compartment 1 and lodging an evaporator 5. The air cooling compartment 4 can be also applied in the rear upper region of a simple refrigerator with only one refrigerating or freezing compartment 2, 1, in order to provide refrigerated air to said compartment.

Independently of the type of refrigerator with forced air circulation to which it is applied, the air cooling compartment 4 presents a circulated air inlet 4a disposed upstream the evaporator 5, and a refrigerated air outlet 4b disposed downstream the evaporator 5 and which is provided through an internal divisional wall 6 of the refrigerator, separating the air cooling compartment 4 from the internal environment of the refrigerator defined by one or more freezing or refrigerating compartments.

In order to produce a forced airflow through the evaporator 5, which is positioned in the air cooling compartment 4, and through the freezing compartment 1 and/or the refrigerating compartment 2 of the refrigerator, there is usually provided a fan 10, which is mounted to the internal divisional wall 6 of the refrigerator, close or through the refrigerated air outlet 4b, in order to draw the refrigerated air to the interior of the air cooling compartment 4 and impel it outwardly from the latter, through the refrigerated air outlet 4b, so as to direct said refrigerated air to the compartments to be refrigerated.

The fan 10 generally comprises an electric motor 11, to whose shaft is mounted a propeller 12 axially aligned with the refrigerated air outlet 4b, the electric motor 11 being affixed to the internal wall 6 by means of a mounting arrangement to be described below.

According to the present invention, the mounting arrangement of the fan 10 comprises a support frame 20, having a marginal portion 21 external to the contour of rotation of the propeller 12 and incorporating a central hub 22 in which is attached the electric motor 11.

In the referred embodiment illustrated in the enclosed drawings, the marginal portion 21 of the support frame 20 presents the form of a tubular shell, with a circular internal contour and which is generally made of injected plastic material, incorporating the central hub 22 in a single piece through a centrally opened radial frame 23. In the illustrated form, said radial frame 23 is defined by a plurality of approximately radial rods interconnecting the central hub 22 to the marginal portion 21 in the form of a tubular shell circumferentially surrounding the propeller 12.

The central hub 22 is preferably constructed in the form of a cylindrical tubular cup, dimensioned to receive the electric motor 11 therein and which defines a circular annular gap with the internal contour of the tubular shell.

The mounting arrangement further comprises a flexible support 30, which is preferably obtained in a single piece of elastomeric material in the form of an annular flange and presents an outer portion 31, an inner portion 32, and an annular membrane portion 33 interconnecting the outer portion 31 and the inner portion 32.

The outer portion 31 presents a polygonal or circular contour, which is compatible with that of the refrigerated air outlet 4b of the internal divisional wall 6, said outer portion 31 being designed to be peripherally and removably affixed to said internal divisional wall 6 along the contour of the refrigerated air outlet 4b.

In the illustrated embodiment, the outer portion 31 of the flexible support 30 is provided with a peripheral groove 34 to be fitted on an edge of the internal divisional wall 6 that defines the contour of the refrigerated air outlet 4b, allowing for an extremely simple, rapid and resistant assembly of the flexible support 30 to the internal divisional wall 6 of the refrigerator.

The inner portion 32 of the flexible support 30 is provided with a generally circular central opening 35, and with retaining means 36, which are removably locked to the marginal portion 21 of the support frame 20 in a condition in which the marginal portion 21 is axially aligned with the central opening 35 of the flexible support 30.

In the illustrated embodiment, the retaining means 36 are defined by median axial projections of the inner portion 32 of the flexible support 30, said axial projections being fitted and retained, by the elastic deformation of respective widened heads 36a, into axial housings 24 provided in the marginal portion 21 of the support frame 20.

The axial housings 24 may be defined as throughbores provided in a peripheral flange 25 of the marginal portion 21 of the support frame 20.

The construction described above allows the flexible support 30 to be easily and rapidly adapted to the internal divisional wall 6, while the support frame 20, which carries the fan 10 and defines a protecting cowling that directs the airflow, is also easily assembled to and disassembled from the inner portion 32 of the flexible support 30. The annular membrane portion 33 is constructed with a thickness smaller than the remaining parts of the flexible support 30 and preferably with an arcuated profile in cross section, in order to allow small relative axial and radial displacements to occur between the outer portion 31 and the inner portion 32 of the flexible support 30, absorbing the vibrations caused during operation of the fan 10.

While the invention has been described and illustrated in relation to a preferred embodiment, it should be understood that changes could be made in the form or physical disposition of the elements, without departing from the constructive concept defined in the claims that accompany the present specification.

The invention claimed is:

1. A mounting arrangement for a refrigerator fan comprising an electric motor, to whose shaft is affixed a propeller with an axial flow passing through a refrigerated air outlet provided through an internal divisional wall of the refrigerator, comprising:
    a support frame having a marginal portion external to the contour of rotation of the propeller and incorporating a central hub in which is affixed the electric motor;
    a flexible support in the form of an annular flange presenting, in a single piece:
        an outer portion, which is peripherally and removably affixed to the internal divisional wall, along the contour of the refrigerated air outlet;
        an inner portion provided with a central opening and with elastic retaining means, which are removably locked to the marginal portion of the support frame in a condition in which said marginal portion is axially aligned with the central opening of the flexible support; and
        an annular membrane portion interconnecting the outer portion and the inner portion, in order to allow for small relative axial and radial displacements therebetween,
    wherein the outer portion of the flexible support is provided with a peripheral groove designed to contact an edge of the internal divisional wall that defines the contour of the refrigerated air outlet.

2. The mounting arrangement according to claim 1, wherein the outer portion of the flexible support is provided with a peripheral groove to be fitted on an edge of the internal divisional wall that defines the contour of the refrigerated air outlet.

3. The arrangement according to claim 1, wherein the retaining means are defined by median axial projections of the inner portion of the flexible support, said axial projections being fitted and retained by the elastic deformation of respective widened heads in axial housings provided in the marginal portion of the support frame.

4. The arrangement according to claim 3, wherein the axial housings are defined by throughbores provided in a peripheral flange of the marginal portion of the support frame.

5. The arrangement according to claim 1, wherein the central hub is incorporated to the marginal portion by means of a centrally opened frame.

6. The arrangement according to claim 1, wherein the support frame has its marginal portion defined by a tubular shell that circumferentially involves the propeller.

7. The arrangement according to claim 6, wherein the central hub and an internal contour of the tubular shell are circular.

8. The arrangement according to claim 1, wherein the annular membrane presents an arcuated profile in cross section.

9. The arrangement according to claim 1, wherein the flexible support is obtained in a single piece of an elastomeric material.

* * * * *

UNITED STATES PATENT AND TRADEMARK OFFICE
CERTIFICATE OF CORRECTION

PATENT NO. : 7,317,267 B2
APPLICATION NO. : 10/507979
DATED : January 8, 2008
INVENTOR(S) : Alexandre Cury Schmid et al.

It is certified that error appears in the above-identified patent and that said Letters Patent is hereby corrected as shown below:

Title page item 73

In the Assignee:

Please delete "Electrodomesticos" and insert --Eletrodomesticos--.

item 74

For Firm:

Please insert --Darby & Darby--.

Signed and Sealed this

Ninth Day of December, 2008

JON W. DUDAS
*Director of the United States Patent and Trademark Office*